Feb. 22, 1966 C. A. TAYLOR 3,236,144
ANCHORING DEVICES FOR USE WITH VARIOUS SIZE BOLTS
Filed Dec. 3, 1962 2 Sheets-Sheet 1
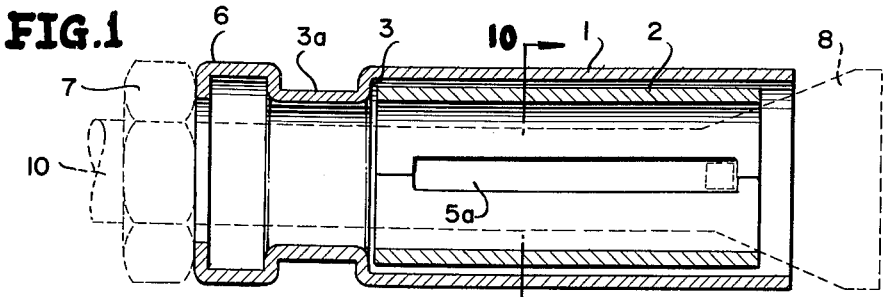
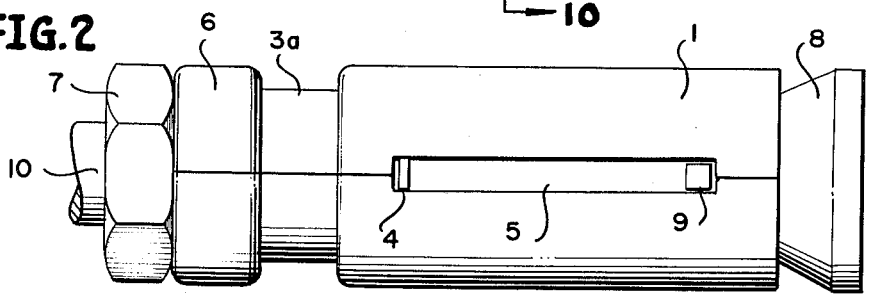
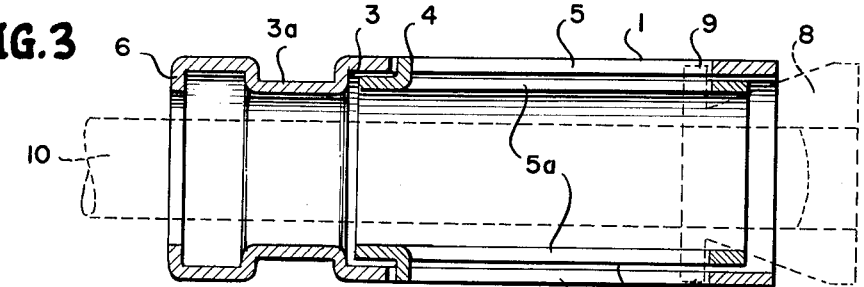
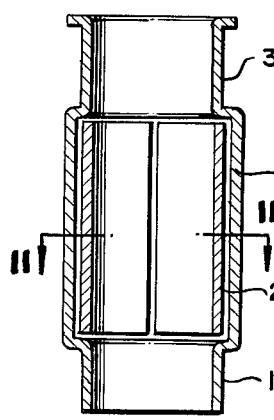
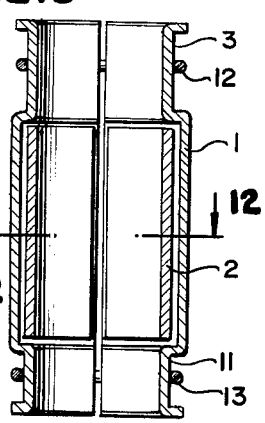
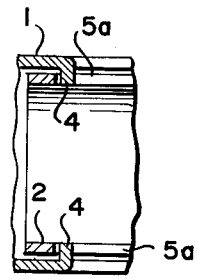
INVENTOR
Cecil Arthur Taylor
BY Shoemaker and Mattare
ATTORNEYS Feb. 22, 1966  C. A. TAYLOR  3,236,144
ANCHORING DEVICES FOR USE WITH VARIOUS SIZE BOLTS
Filed Dec. 3, 1962  2 Sheets-Sheet 2
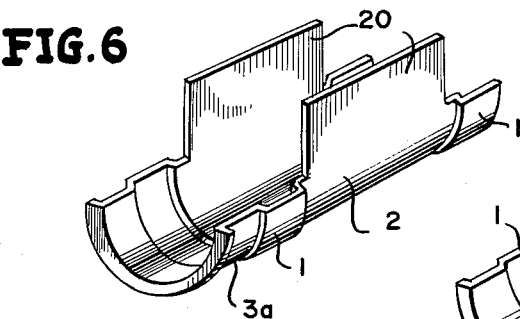
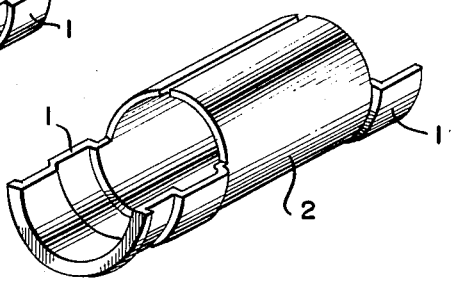
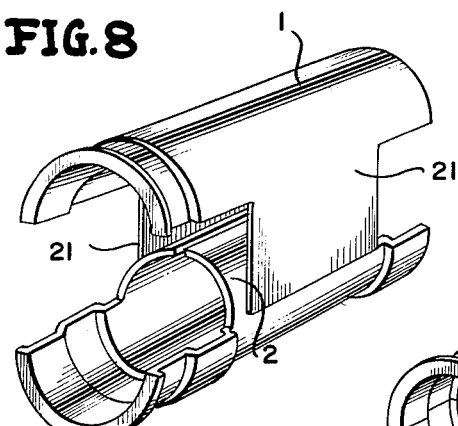
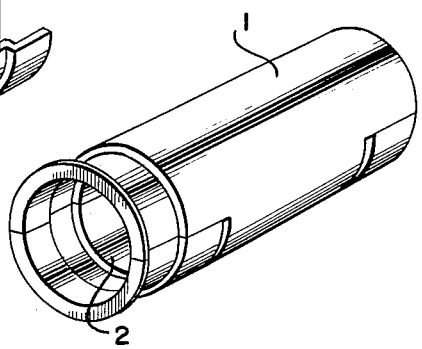
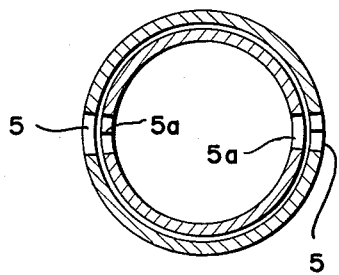
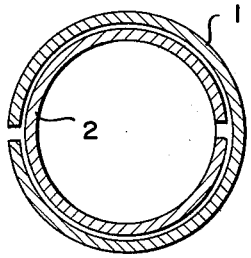
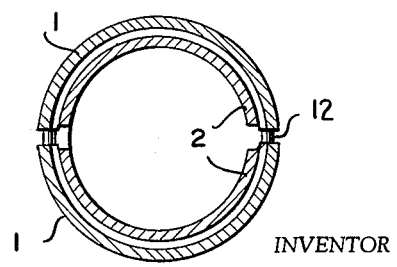
INVENTOR
CECIL ARTHUR TAYLOR
BY Shoemaker and Mattare
ATTORNEYS

United States Patent Office 3,236,144
Patented Feb. 22, 1966

3,236,144
ANCHORING DEVICES FOR USE WITH
VARIOUS SIZE BOLTS
Cecil Arthur Taylor, London, England, assignor to The
Rawlplug Company Limited, London, England
Filed Dec. 3, 1962, Ser. No. 241,954
Claims priority, application Great Britain, Dec. 29, 1961,
46,775/61
5 Claims. (Cl. 85—75)

The invention relates to anchoring devices suitable for fixing in holes prepared in brickwork, masonry, concrete and the like and which comprise a shield capable of being expanded in the hole by means of an expansion member drawn into the shield.

Unless the hole in the brickwork or the like is made considerably oversized to receive an expansion member which is larger than the outside diameter of the shield, the amount of expansion of the shield is limited by the thickness of the shield, i.e. the diameter of the expanded shield cannot exceed the sum of the diameter of the unexpanded shield plus twice the thickness of its material. Consequently, since the shield is to be a substantially close fit in the hole, it is desirable to make the shield as thick as possible but it is also desirable to minimize production costs by forming the shield from sheet metal which is usually thin and must be so to facilitate formation of the shield such as by cutting and stamping.

A previous suggestion for making anchoring devices was to form a shield from sheet metal and then provide additional thickness for the shield by encircling it with rings or strips of sheet metal on its outside. These strips had the disadvantage that they involved elaborate precautions to secure them on the shield and, in fact, made it more difficult for the shield to grip the walls of the hole in which the device was to be expanded. It was found to be possible to indent the shield in order to hold a strip against sliding thereon but this only had the effect of still further reducing the grip of the shield on the walls of the hole.

The expansion member for the shield may be a threaded nut which is drawn into the shield by turning a bolt cooperating with it or it may be the head of a bolt which is drawn into the shield by tightening a nut on its threaded shank. In practice, a desirable production feature is to reduce the number of dies that are used to make the device by using the same size shield for more than one bolt size. This also has the effect of reducing the number of drill sizes that a user must have for drilling holes in the brickwork or the like.

The invention has been developed with the above considerations in mind.

According to the invention, an anchoring device for fixing in holes prepared in brickwork, masonry, concrete and the like, comprises an expansible sheet metal shield, a shorter expansible sheet metal sleeve contained within the shield and held therein against appreciable displacement and rotation, and a tapered expansion member adapted to be drawn into the sleeve so as to expand the shield.

By providing the sleeve within the shield not only can it be readily held relatively to the shield but it is also possible to use one shield size for more than just one size of bolt. This would not be convenient if the shield thickness were to be built up by providing a ring around the shield because firstly, in the case of a shield designed to accommodate one size of bolt but used with a smaller size, the gap between the bolt and the inside of the shield allows the expansion member to be drawing obliquely into the shield and become jammed; secondly, a gap between the bolt and the shield allows the shield to buckle and collapse inwardly under columnar stress; thirdly, the hole that has to be drilled in the wall to receive the device is unnecessarily large since it is larger in diameter than the ring which, in turn, is larger in diameter than the shield which, again, is often very much larger than the bolt when a smaller bolt is being used.

With the anchoring device of the invention, it is an easy matter to use the same shield with different size bolts. All that is required to adapt a shield for use with a particular bolt size is to fit an appropriately thick sleeve or sleeves together with an appropriate expansion member. In this way, it is possible to avoid a large gap between the sleeve and the bolt so that the disadvantages previously mentioned are minimized or eliminated.

The sleeve is preferably located so as to overlap the expansion member when the latter is assembled therewith but before expansion has taken place. The expansion member may protrude from the shield. The sleeve may be held within the shield in various ways. For example, it may be spot-welded thereto. In another embodiment, the sleeve may be held in the shield against initial sliding and rotation by means of a projection on it engaging in an aperture or recess in the shield or vice versa. Alternatively, or in addition, the sleeve can be prevented from sliding by means of a shoulder or shoulders in the shield.

In one form of the invention both the sleeve and the expansion member are retained in the shield. The shield and sleeve are provided with aligned slots for receiving lugs provided on the expansion member. Such lugs not only hold the expansion member to the shield but also serve to prevent the sleeve from rotating relatively to the shield.

The shield and/or sleeve may each be made in one piece or in segments which are held together by retaining rings.

Examples of the invention are illustrated in the accompanying drawings, wherein:

FIG. 1 is a sectional elevation of an anchoring device of the bolt projecting type according to the invention;

FIG. 2 is a side elevation of the device in FIG. 1;

FIG. 3 is a sectional elevation of an anchoring device of the loose bolt type, according to the invention;

FIGS. 4 and 5 are sectional elevations of modified expansible shields showing the sleeves therein but other parts being omitted for clarity;

FIGS. 6 to 9 inclusive are perspective views showing the stages of construction of another form of expansible shield and sleeve;

FIG. 10 is a section taken on the line X—X in FIG. 1;

FIG. 11 is a section taken on the line XI—XI in FIG. 4;

FIG. 12 is a section taken on the line XII—XII in FIG. 5, and

FIG. 13 is a fragmentary sectional elevation of a modification of the FIG. 3 embodiment.

The anchoring device comprises an expansible sheet metal shield member 1 and expansible sheet metal inner sleeve member 2. The shield and sleeve members may each be formed in one piece as shown in FIGS. 1 to 4, 10, 11 and 13 or in segments as shown in FIGS. 5 and 12 where the shield segments are held together by retaining rings 12 and 13 and the sleeve segments are spot welded to the shield. It is also possible to make the sleeve in one piece and the shield in two segments, as described hereinafter with reference to FIGS. 6 to 9.

Referring to FIGS. 1, 2, 3 and 10, the sleeve is held in the shield against appreciable displacement by a shoulder 3 formed by a neck 3a impressed in the shield as well as by one or two projections 4 on the sleeve engaging in a corresponding number of slots 5 in the shield. Each projection 4 is in the form of a flange at the end of a slot 5a in the sleeve. The slots 5 and 5a also serve to receive lugs 9 on an expander or expansion member 8 for the purpose of retaining the latter in the end of the shield and preventing it from rotating or being lost. It will be evident that the lugs 9 provide additional means preventing rotation of the sleeve 2 in the shield.

In the case of FIGS. 1 and 2, the expansion member 8 is the head of a bolt 10 which is drawn into the sleeve by tightening a nut 7 against the end of the shield or against the article being secured whereas in FIG. 3, the expansion member is a nut drawn into the sleeve by turning a bolt 10 or the like which is prevented from axial displacement by, say, its head (not shown) abutting against the end of the shield or against the face of the wall bounding the hole in which the anchor is inserted or against the article which is to be secured by means of the anchor.

FIG. 13 illustrates a modification of the FIG. 3 embodiment where flanged projections 4 on the shield engage in the slots 5a in the sleeve.

In FIGS. 4, 5, 11 and 12 a neck 11 is formed at the rear of the shield in addition to the neck 3 at the front. The expansion member, slots and projections may be the same as for FIG. 1 or 3. In the case of FIG. 5, the two necks also serve to accommodate the retaining rings 12 and 13.

In FIGS. 6 to 9, the sleeve 2 is made in one piece with one of two shield segments. It is formed from an indented portion of the sheet metal stamping shown in FIG. 6 and two rectangular extensions 20 which are curved over to complete the sleeve 2 as shown in FIG. 7. The portions of this stamping designated 1 are those which form part of the shield. A second sheet metal shield segment with extensions 21 (FIG. 8) is placed over the first segment and its extensions 21 are then bent around to lie in the indentation and hold the two segments together (FIG. 9). The expansion member has been omitted for clarity, but it is preferably inserted in the end of the shield during formation of the latter and retained therein by any suitable means.

In use, the anchoring device is inserted in a prepared hole and the expansion member 8 is drawn into the sleeve such as by turning the nut 7 in FIG. 1 or turning the bolt or stud 10 in FIG. 3. This causes the sleeve and shield to expand and become firmly anchored in the hole. If the maximum diameter of the expansion member is equal to the outside diameter of the shield, the amount of expansion of the shield can equal twice the sum of the thicknesses of the shield and the sleeve.

In the manufacture of the anchoring device, the same size shield could be used for more than one size of bolt, say, for the bolt size as illustrated in FIG. 1 as well as for a size smaller by choosing an appropriately thicker sleeve. Thus the maximum possible amount of expansion can still be obtained in each case. This means that for an entire range of bolt sizes a very much smaller number of dies are needed to produce the shield stampings. Also, far fewer drill sizes are required for preparing the holes in which the shields are to be expanded.

I claim:

1. An anchoring device for fixing in holes prepared in brickwork, masonry, concrete and the like comprising an expansible cylindrical sheet metal shield member, a shorter expansible cylindrical sheet metal sleeve member contained concentrically within said shield member, an internal shoulder on said shield member engaged by said sleeve member and limiting displacement of said sleeve member therein toward a first end of said shield member, one of said members having a slot therein closed at that end of the member opposite said first end, the other of said members comprising a projection which extends into the said slot, a tapered expander adapted to be drawn into said sleeve member toward the first end of said shield to expand said sleeve member and said shield member, said expander and one of said members including a radial lug and a longitudinal slot, said lug being disposed in said longitudinal slot.

2. An anchoring device as set forth in claim 1 wherein said projection comprises a folded-up flange formed from member material which has been removed to form the longitudinal slot.

3. An anchoring device as set forth in claim 1 wherein at least one of said members comprises segments.

4. An anchoring device as set forth in claim 1 wherein said expander has a diameter no larger than the unexpanded exterior diameter of the shield and no smaller than the unexpanded inner diameter of said sleeve.

5. An anchoring device for fixing in holes prepared in brickwork, masonry, concrete and the like comprising an expansible cylindrical sheet metal shield member, a shorter expansible cylindrical sheet metal sleeve member contained concentrically within said shield member, an internal shoulder on said shield member engaged by said sleeve member and limiting displacement of said sleeve member therein toward a first end of said shield member, one of said members having a slot therein closed at that end of the member opposite said first end, the other of said members comprising a projection which extends into the said slot, a tapered expander adapted to be drawn into said sleeve member toward the first end of said shield to expand said sleeve member and said shield member, said expander including a radial lug disposed in said slot.

References Cited by the Examiner

UNITED STATES PATENTS

| | | | |
|---|---|---|---|
| 1,265,866 | 5/1918 | Ackerman | 85—69 |
| 1,429,299 | 9/1922 | Pleister | 85—75 |
| 1,432,310 | 10/1922 | Tomkinson | 85—87 |
| 1,790,841 | 2/1931 | Rosen | 85—75 |
| 1,850,768 | 3/1932 | Peirce | 85—74 |
| 2,762,119 | 9/1956 | Jackson. | |
| 2,831,520 | 4/1958 | Clarke | 151—69 |

CARL W. TOMLIN, *Primary Examiner.*

EDWARD C. ALLEN, *Examiner.*